US012747013B2

(12) United States Patent
Julliand et al.

(10) Patent No.: US 12,747,013 B2
(45) Date of Patent: Sep. 29, 2026

(54) CYCLOROTORS

(71) Applicant: GE ENERGY POWER CONVERSION TECHNOLOGY LIMITED, Warwicksire (GB)

(72) Inventors: Lionel Julliand, Belfort (FR); Jorgen Jorde, Bergen (NO); Theo Grall, Belfort (FR)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 145 days.

(21) Appl. No.: 18/694,675

(22) PCT Filed: Nov. 23, 2021

(86) PCT No.: PCT/EP2021/082620
§ 371 (c)(1),
(2) Date: Mar. 22, 2024

(87) PCT Pub. No.: WO2023/093970
PCT Pub. Date: Jun. 1, 2023

(65) Prior Publication Data

US 2024/0400179 A1 Dec. 5, 2024

(51) Int. Cl.
*B63H 1/10* (2006.01)
*G01M 3/26* (2006.01)

(52) U.S. Cl.
CPC ................ *B63H 1/10* (2013.01); *G01M 3/26* (2013.01)

(58) Field of Classification Search
CPC .................................. B63H 1/10; G01M 3/26
USPC ........................................................ 440/113
See application file for complete search history.

(56) References Cited

U.S. PATENT DOCUMENTS 3,371,719 A 3/1968 Baer

FOREIGN PATENT DOCUMENTS

| | | | |
|---|---|---|---|
| DE | 724097 | C | 8/1942 |
| DE | 852051 | C | 10/1952 |
| DE | 1234566 | B | 2/1967 |
| NL | 49606 | C | 11/1940 |
| WO | 2023093970 | A1 | 6/2023 |

OTHER PUBLICATIONS

International Search Report and Written Opinion for International Application No. PCT/EP2021/082620 dated Sep. 16, 2022, 10 pages.

Korean Patent Application No. 10-2024-7020506, Office Action dated Mar. 27, 2026, 56 pages.

*Primary Examiner* — T. Scott Fix
(74) *Attorney, Agent, or Firm* — Wood IP LLC; Theodore A. Wood

(57) ABSTRACT

An arrangement is described includes a pressurised gas system and a cyclorotor located within an annular structure. The cyclorotor can be a propulsor for a marine vessel and includes a rotary housing spaced apart from the structure by an annular volume, and a plurality of blades extending from a surface of the rotary housing, each blade having a respective blade axis about which it can be pivoted relative to the rotary housing. The pressurised gas system includes a pressurised gas supply, one or more gas outlets in fluid communication with the annular volume, and a gas supply unit with a controller adapted to control the delivery of pressurised gas from the pressurised gas supply into the annular volume through the one or more gas outlets.

24 Claims, 5 Drawing Sheets

CYCLOROTORS

CROSS-REFERENCE TO RELATED APPLICATIONS

This application is a national stage entry of International Application No. PCT/EP2021/082620, filed Nov. 23, 2021, which is incorporated herein by reference for its entirety.

TECHNICAL FIELD

The present invention relates to cyclorotors, and in particular to cyclorotors that can be used as propulsors when mounted to the hull of a marine vessel. However, the cyclorotors can also be used as water turbines.

BACKGROUND

Known propulsors include a plurality of blades extending from a rotary housing, where each blade can be pivoted by a blade actuator about a respective blade axis to provide thrust in any direction normal to the axis of rotation of the rotary housing. Such propulsors are sometimes also referred to as cyclorotors, cycloidal propellers or propulsion units and Voith-Schneider propellers operating in cycloidal or trochoidal modes.

Each blade actuator can use one or more of mechanical, hydraulic, pneumatic, and electric actuators, e.g., an electric motor, to pivot the respective blade about its blade axis.

The rotary housing is normally spaced apart from a surrounding part of the hull of the marine vessel by an annular volume that is full of seawater. The seawater creates friction losses between the rotary housing and the surrounding stationary structure. A similar annular volume will also be present in a water turbine where the cyclorotor is surrounded by a stationary structure and where rotation of the rotary housing by moving water will generate electrical power.

SUMMARY

The present invention aims to solve this problem by excluding water from the annular volume using a pressurised gas, e.g., compressed air. More particularly, the present invention provides an arrangement comprising cyclorotor located within an annular structure and a pressurised gas system, the cyclorotor comprising a rotary housing spaced apart from the structure by an annular volume, and a plurality of blades extending from a surface of the rotary housing, each blade having a respective blade axis about which it can be pivoted relative to the rotary housing, the pressurised gas system comprising:

- a pressurised gas supply;
- one or more gas outlets in fluid communication with the annular volume; and
- a controller adapted to control the delivery of pressurised gas from the pressurised gas supply into the annular volume through the one or more gas outlets.

During use, the cyclorotor will normally be at least partially immersed in water such as seawater, for example. The delivery of pressurised gas into the annular volume will displace any water in the annular volume. The annular volume between the rotary housing and the structure is preferably substantially filled with gas at a desired pressure when the rotary housing is rotating—i.e., when the cyclorotor is operational. When the rotary housing is not rotating, the pressurised gas system does not need to be operational, and the annular volume can be full of water. On starting the pressurised gas system, the pressurised gas will be delivered into the annular volume through the one or more gas outlets and will start to displace the water out of the annular volume. Rotation of the rotary housing may also displace water out of the annular volume as a result of centrifugal force acting in combination with the pressurised gas delivery.

The annular structure can be part of the hull of a marine vessel. The structure can be an annular collar that surrounds the rotary housing, and which forms a structural part of the hull of the marine vessel. The profile of the inner surface of the collar preferably conforms generally to the outer profile of the rotary housing and the annular volume is defined by an annular gap or clearance between the rotary housing and the collar that allows the rotary housing to rotate freely. The outer profile of the rotary housing can include one or more recessed areas or voids, e.g., between pairs of radially outwardly extending blade module housings. These recessed areas or voids form part of the annular gap between the rotary housing and the annular structure or collar. Without the pressurised gas system, these recessed areas or voids would also be full of water. When the cyclorotor is operating, the entrained water must be rotated along with the rotary housing, thereby causing additional friction, noise, vibration and imbalance within the cyclorotor. Such problems are avoided by the present invention because the water is displaced from the recessed areas or voids by the introduction of the pressurised gas.

The cyclorotor can be installed in the hull of the marine vessel as a propulsor. In this case, the pressurised gas system can be part of the marine vessel. The pressurised gas system can also be part of the cyclorotor, or components of the pressurised gas system can be distributed between the marine vessel and the cyclorotor. If the one or more gas outlets are part of the rotary housing and the pressurised gas supply is stationary (e.g., part of a marine vessel or mounted on a stationary part of the cyclorotor such as a mounting plate or other mounting structure), the pressurised gas supply will normally need to be connected to each gas outlet by a suitable coupling that provides an interface between the stationary and rotating parts of the pressurised gas system.

The pressurised gas supply can be a gas supply for the marine vessel from which pressurised gas can be extracted through one or more flow valves, for example.

The pressurised gas supply can be a suitable compressor or fan unit, which can be a stand-alone component of the pressurised gas system. In other words, the pressurised gas supply can be used only for supplying pressurised gas for the pressurised gas system.

Although air may generally be preferred as the pressurised gas, it will be readily understood that any suitable gas can be used in practice and that using an inert gas (such as nitrogen, for example) can reduce corrosion of cyclorotor or annular collar components by providing a protective environment within the annular volume. This might be particularly beneficial for any steel components.

The controller can control the delivery of the pressurised gas from the pressurised gas supply to the one or more gas outlets by any suitable control means, e.g., one or more flow valves upstream of the gas outlets, or by controlling the operation of a compressor or fan unit, e.g., its rotational speed.

Any suitable gas outlet can be used to deliver the pressurised gas.

In one arrangement, each gas outlet can be mounted on the rotary housing (or some other part of the cyclorotor) or on the annular structure and can be connected to the pressurised gas supply by any suitable tubing or pipework. If the pressurised gas system has a plurality of gas outlets, they can be distributed between the cyclorotor and the annular structure.

In another arrangement, the interior of the rotary housing can be pressurised by the pressurised gas system and each gas outlet can be an opening in the rotary housing in fluid communication with the annular volume. In this arrangement, the gas that is used to pressurise the interior of the rotary housing can therefore also be used to pressurise the annular volume and displace the water. In yet another arrangement, each gas outlet can be an opening in the annular structure (or the hull of the marine vessel) in fluid communication with the annular volume.

The cyclorotor can further comprise a plurality of blade actuators, blade actuator being associated with a respective one of the blades for pivoting the respective blade about its blade axis. Each blade actuator can include one or more of a mechanical actuator, a hydraulic actuator, and an electric actuator that uses an electric motor to pivot the respective blade.

The cyclorotor can further comprise a slewing bearing rotatably mounting the rotary housing, the slewing bearing comprising a rotating part fixed to the rotary housing and a stationary part. The stationary part can be adapted to be fixed to the annular structure, either directly or indirectly by means of a mounting plate or mounting structure. The cyclorotor can further comprise an electric machine with a drive shaft that is mechanically connected to the rotating part of the slewing bearing. The electric machine can be a motor for driving the rotation of the rotary housing through the rotating part of the slewing bearing, or a generator for generating electrical power if the cyclorotor is a turbine and the rotary housing is rotated by moving water acting on the blades.

The annular volume can have a first end adjacent the surface of the rotary housing from which the blades extend, and a second end. A first seal can be provided on at least one of the rotary housing and the structure at the first end of the annular volume. The first seal can be used to reduce the leakage of pressurised gas out of the annular volume. (It will be readily understood that water can be displaced past the first seal by the introduction of the pressurised gas.) A second seal can also be provided at the second end of the annular volume, for example adjacent the slewing bearing of the cyclorotor.

The present invention further provides a method of operating a cyclorotor located within an annular structure, the cyclorotor comprising:

- a rotary housing spaced apart from the structure by an annular volume; and
- a plurality of blades extending from the rotary housing, each blade having a respective blade axis about which it can be pivoted relative to the rotary housing;
- the method comprising delivering pressurised gas into the annular volume, e.g., through one or more gas outlets that are in fluid communication with the annular volume.

The delivery of the pressurised gas can be controlled, e.g., by a controller, based on one or more of the following:

- the flow rate of the pressurised gas into the annular volume,
- the gas pressure inside the annular volume,
- the water pressure outside the annular volume, e.g., below the hull of the marine vessel,
- the speed of the marine vessel,
- marine vessel data, e.g., draught, and
- the rotational speed of the cyclorotor.

The flow rate of the pressurised gas into the annular volume can be measured by one or more flow meters upstream of the one or more gas outlets.

The gas pressure inside the annular volume can be measured by one or more pressure meters that can be located on the cyclorotor and/or the annular structure or collar.

The water pressure outside the annular volume can be measured by one or more pressure meters that can be located on the cyclorotor and/or on the annular structure or collar (or elsewhere on the hull of the marine vessel). Such pressure meters can be mounted flush with the hull or other mounting structure.

The flow meters and pressure meters provide measurements to the controller.

Any suitable control can be implemented by the controller. In one arrangement, the delivery of pressurised gas can be controlled so that the gas pressure within the annular volume is substantially the same as the external water pressure outside the annular volume, e.g., below the hull of the marine vessel. The gas pressure within the annular volume can be deliberately selected to be slightly higher or slightly lower than the water pressure outside the annular volume. In one arrangement, the delivery of the pressurised gas can be controlled to a target gas pressure, which target gas pressure can be pre-selected or determined with reference to the external water pressure outside the annular volume and optionally other operating parameters. The target gas pressure can be compared against the measured gas pressure within the annular volume and any error between the target and measured gas pressures can be used to control the delivery of the pressurised gas into the annular volume. The control can take into account practical and cost-related factors such as the maximum gas flow that the pressurised gas system can provide or which is economical, and a maximum gas pressure within the annular volume, for example.

As noted above, the control can also take into account other operating parameters in order to optimise the delivery of the pressurised gas such as the speed of the marine vessel, which affects dynamic pressure, the draught of the marine vessel (i.e., the vertical distance between the waterline and the bottom of the hull where the cyclorotor is positioned), which affects static pressure, and the rotational speed of the cyclorotor, which affects the displacement of water caused by the rotation of the rotary housing.

The target gas pressure can be varied according to an operating mode, for example an operating mode of the marine vessel such as manoeuvring, transit, silent running etc.

Changes in the delivery of the pressurised gas over time can be used for condition monitoring, for example monitoring the condition of the first seal that is designed to reduce the leakage of pressurised gas out of the annular volume.

The present invention provides the following technical benefits:

- a reduced friction loss because water is displaced from the annular volume and is replaced with pressurised gas, this has particular benefits for large diameter cyclorotors,
- the seal design can be simplified,
- less entrained water means less noise, lower vibrations and imbalance,
- the hydrodynamic bearing effect is substantially eliminated,
- corrosion is reduced if an inert gas is used,
- sea growth within the annular volume is reduced.

DETAILED DESCRIPTION

Figure 1:
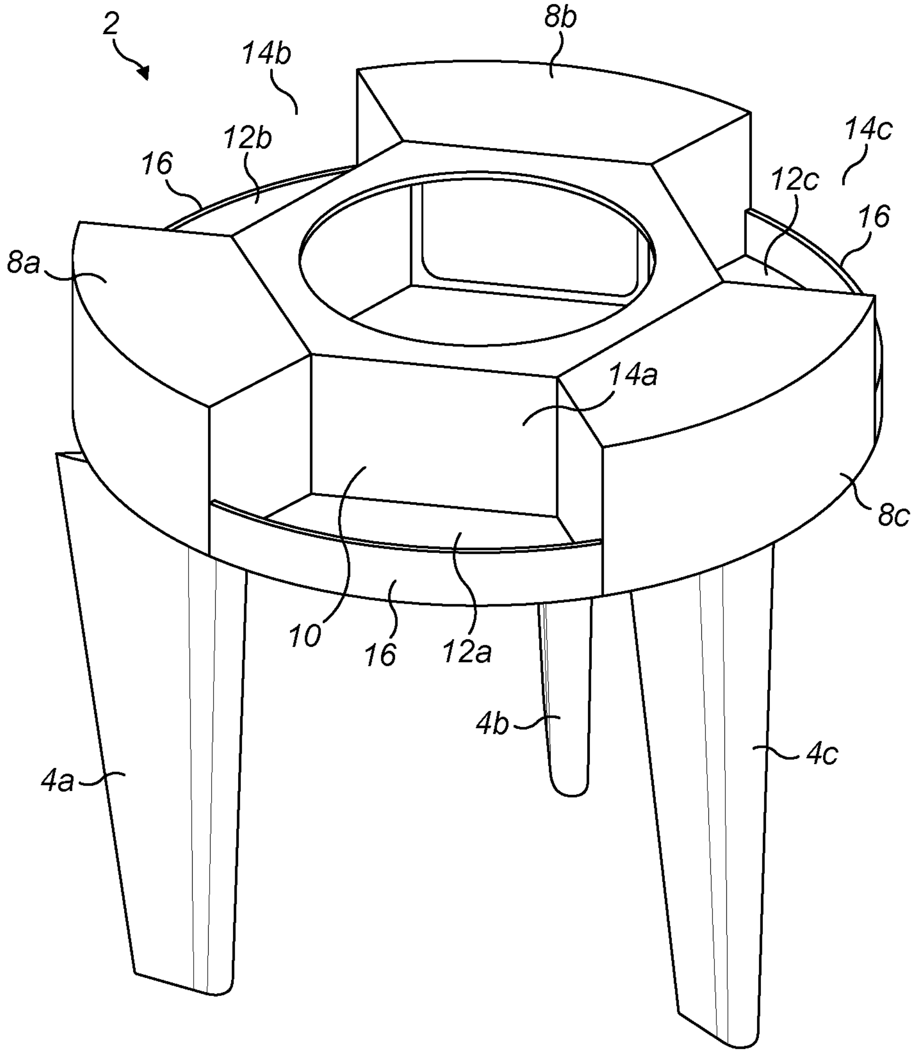
FIG. 1 is a perspective view of a rotary housing of a propulsor according to the present invention.
Figure 2:
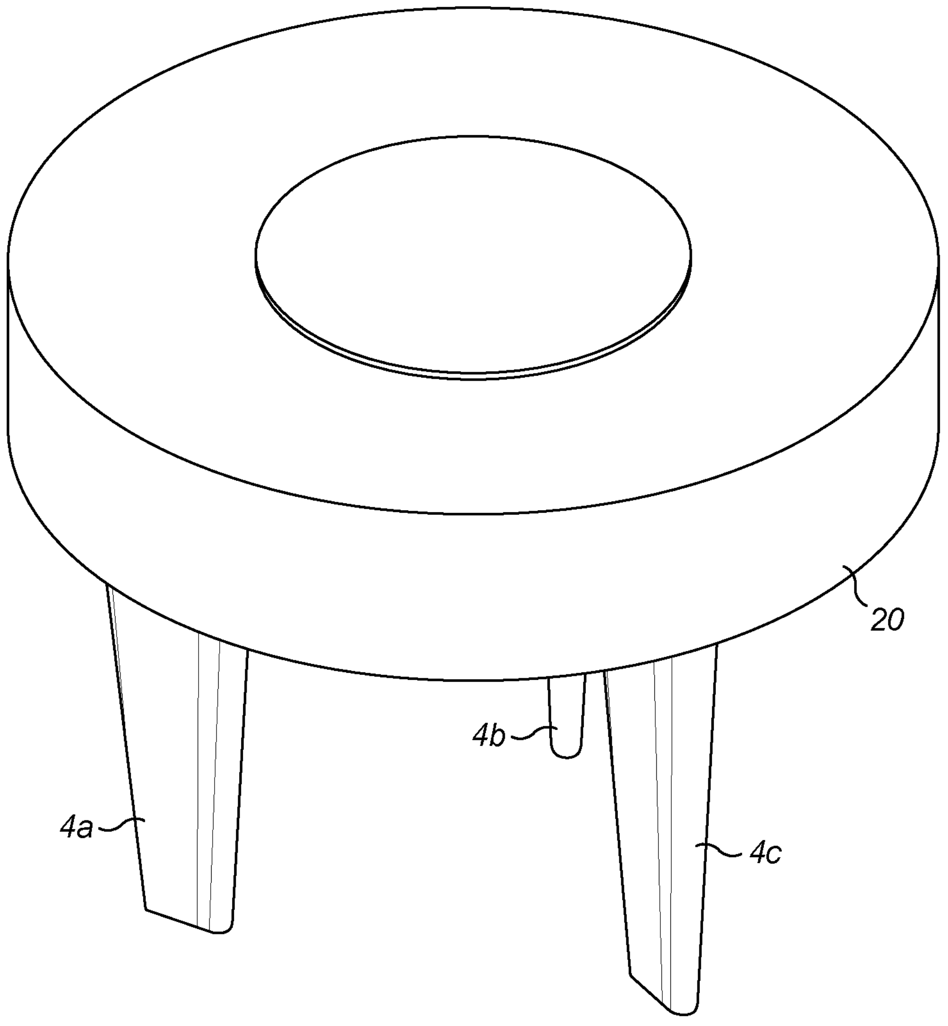
FIG. 2 is a perspective view of a propulsor according to the present invention installed in the hull of a marine vessel.

Although the following description describes a cyclorotor that is used as a propulsor for a marine vessel, it will be readily understood that the same principles can be applied to other types of cyclorotor, e.g., for turbines that are also immersed in water in use.

Referring to FIGS. 1 to 5, a propulsor 1 for a marine vessel includes a rotary housing 2. Three blades 4*a*, . . . , 4*c* extend axially from the lower surface of the rotary housing 2. Each blade 4*a*, . . . , 4*c* has a respective blade axis 6 about which it can be pivoted relative to the rotary housing 2 by a blade actuator (not shown). Each blade 4*a*, . . . , 4*c* is mounted in a respective blade module 8*a*, . . . , 8*c* that extends radially outwardly from a main body 10. The three blade modules 8*a*, . . . , 8*c* are arranged circumferentially around the main body 10 and are separated by plates 12*a*, . . . , 12*c*. The plates 12*a*, . . . , 12*c* extend radially outwardly from the main body 10 at the lower surface of the rotary housing 2 and are positioned between the blade modules 8*a*, . . . , 8*c*. Each plate 12*a*, . . . , 12*c* includes an upstanding flange 16. Three recessed areas or voids 14*a*, . . . , 14*c* are defined between the blade modules 8*a*, . . . , 8*c* and above the plates 12*a*, . . . , 12*c*.

Figure 3:
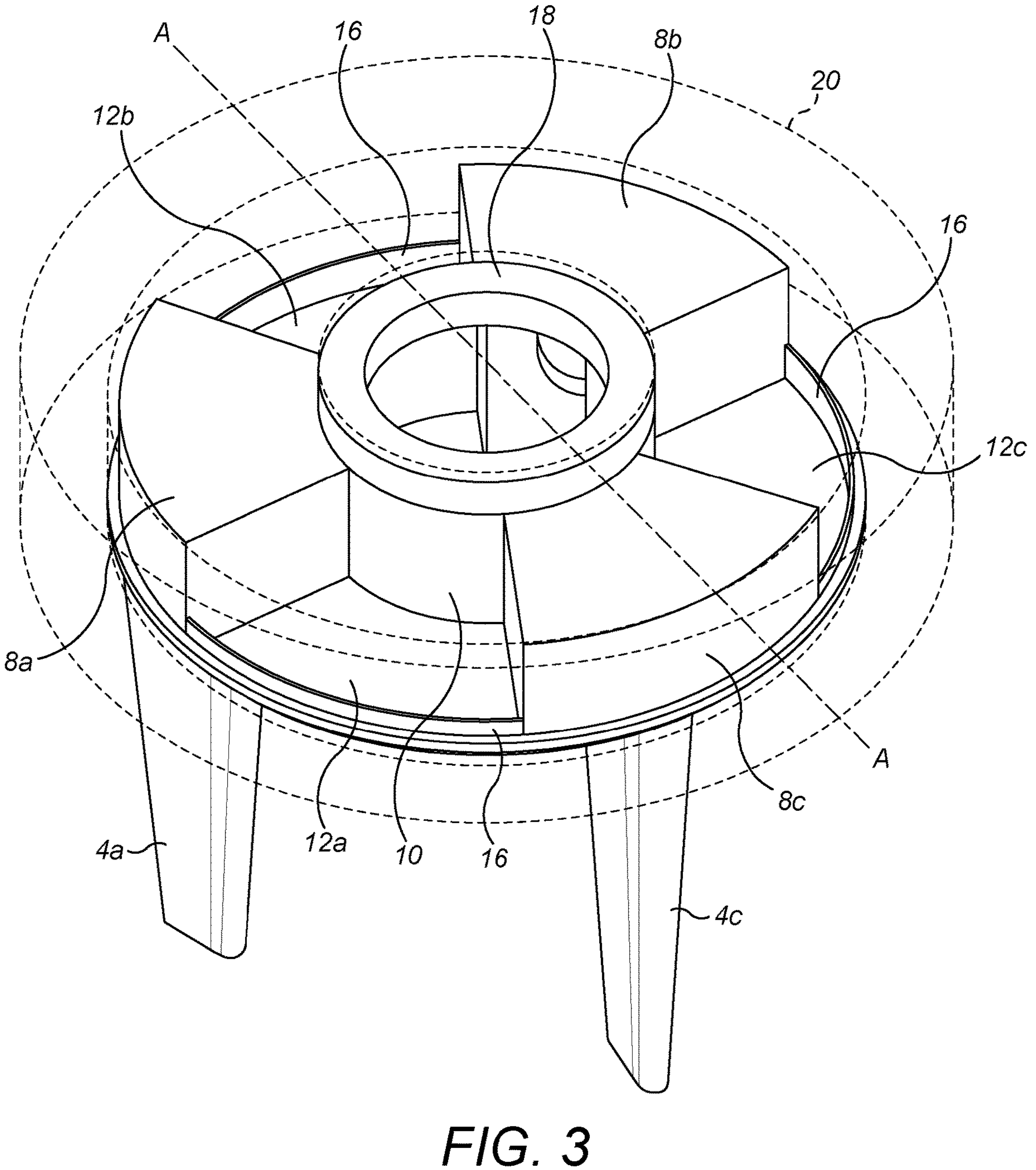
FIG. 3 is a perspective view of the installed rotary housing shown in FIG. 1 and a slewing bearing.
Figure 4:
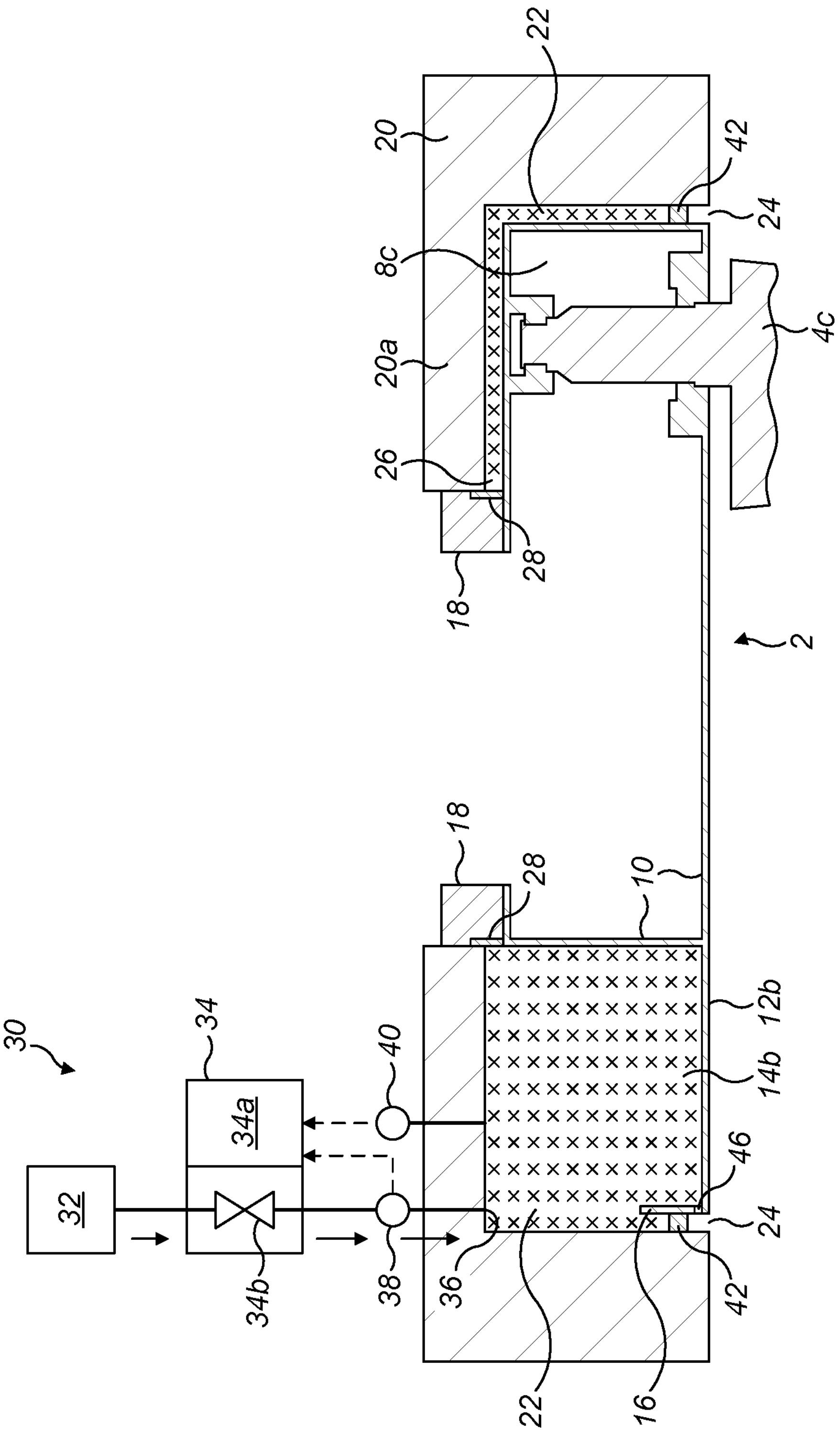
FIG. 4 is a cross section view along line A-A of FIG. 3 and also showing the gas pressure system.
Figure 5:
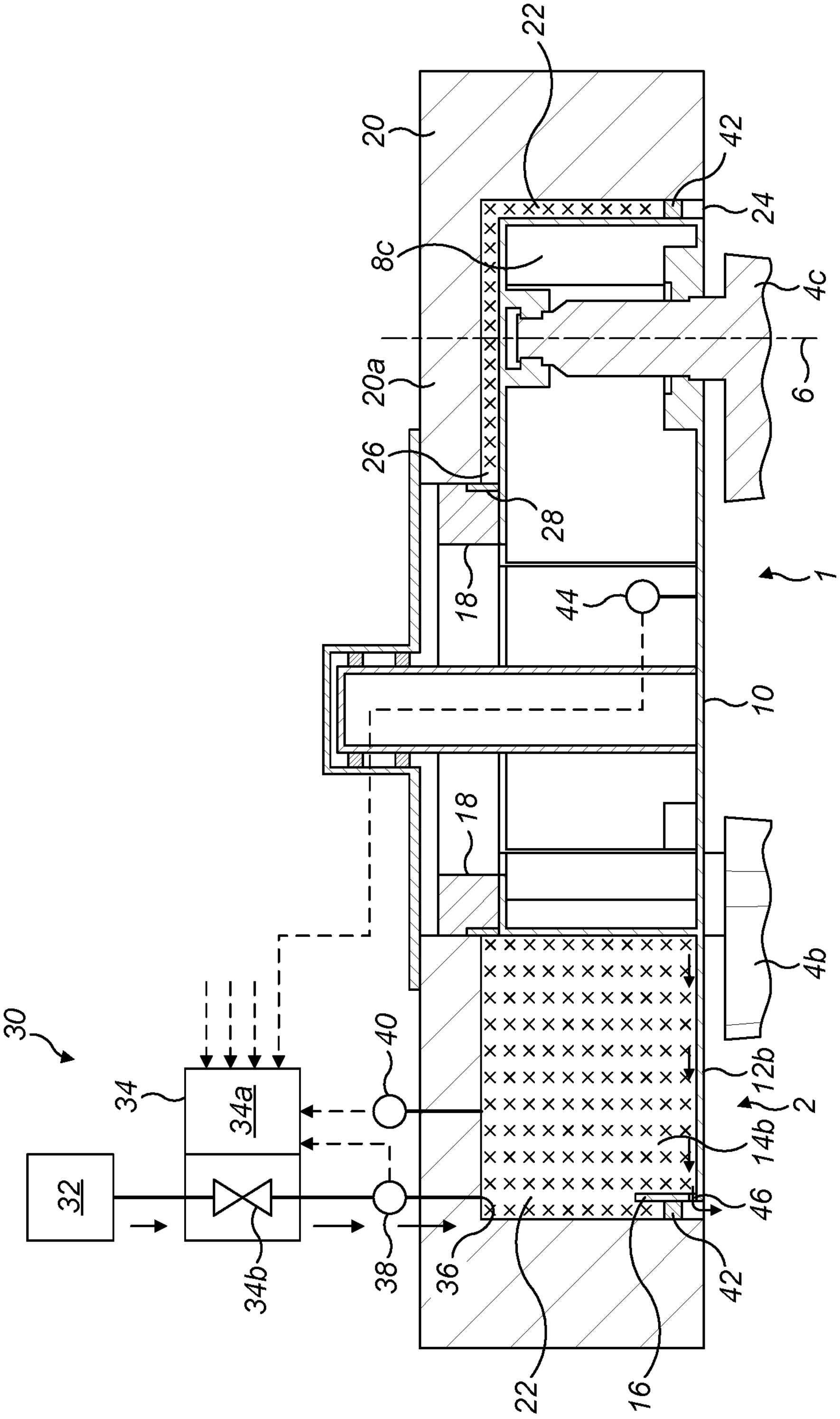
FIG. 5 is a cross section of an installed propulsor and gas pressure system according to the present invention.

As shown in FIGS. 3 to 5, the propulsor 1 includes a slewing bearing 18 for rotatably mounting the rotary housing 2. The slewing bearing 18 includes a rotating ring fixed to the rotary housing 2, and a stationary ring. The stationary ring is adapted to be fixed to the hull of the marine vessel, optionally by means of a mounting plate or other structure. The rotating ring is driven to rotate by an electric motor (not shown) so that the rotary housing 2 rotates relative to the hull.

FIGS. 2 to 5 show the propulsor mounted within an annular collar 20 that forms a structural part of the hull of the marine vessel. The inner surfaces of the annular collar 20 define an inner profile that conforms generally to the outer profile of the rotary housing 2.

The rotary housing 2 and the inner surfaces of the annular collar 20 are separated by an annular volume 22 that allows the rotary housing to rotate freely. The annular volume 22 comprises an outer volume that extends between the radially outer surface of the blade modules 8*a*, . . . , 8*c* and the upstanding flange 16 of each plate 12*a*, . . . , 12*c*, and the facing surface of the annular collar 20. The annular volume 22 also comprises the three recessed areas or voids 14*a*, . . . , 14*c* between the blade modules 8*a*, . . . , 8*c*.

The annular volume 22 has an open end 24 at the lower surface of the rotary housing 2 and a closed end 26 adjacent the slewing bearing 18. A seal 28 is provided at the closed end 26 to provide a watertight seal and prevent the ingress of water into the interior of the rotary housing through the slewing bearing 18.

It will be understood that without the pressurised gas system of the present invention, the presence of water in the annular volume 22 will result in a friction loss when the rotary housing 2 is driven to rotate relative to the annular collar 20. Water entrained in the recessed areas or voids 14*a*, . . . , 14*c* between the blade modules 8*a*, . . . , 8*c* must be rotated along with the rotary housing 2, which causes additional losses, noise, unwanted vibration, and imbalance.

A pressurised gas system 30 comprises a pressurised gas supply 32 (e.g., a compressed air supply for the marine vessel). A gas supply unit 34 is in fluid communication with the pressurised gas supply 32 and includes a controller 34*a* that controls the delivery of pressurised gas from the pressurised gas supply 32 into the annular volume 22 through a gas outlet 36. The gas supply unit 34 also includes one or more flow values 34*b* for controlling the flow of pressurised gas from the pressurised gas supply 32 to the gas outlet 36. The pressurised gas system 30 shown in FIGS. 4 and 5 has a single gas outlet 36 in fluid communication with the annular volume 22. (Although in FIGS. 4 and 5, the gas outlet 36 is shown to be in fluid communication with one of the voids 14*b*, it will be readily understood that this is for the particular position of the rotary housing 2, and that the rotary housing will be rotating relative to the gas outlet during operation of the propulsor. However, even when the gas outlet 36 is aligned with one of the blade modules, it will be in fluid communication with the gap between the upper surface of the blade module and the facing lower surface of the radially inwardly extending part 20*a* of the annular collar 20.) It will be readily understood that two or more gas outlets can be provided, and that each gas outlet can be in fluid communication with any part of the annular volume. For example, a plurality of gas outlets might be circumferentially spaced around the annular collar 20. The gas outlet 36 is shown to be part of the annular collar 20, but one or more gas outlets can also be provided on the rotary housing 2 or on a stationary part of the propulsor as described above. In FIGS. 4 and 5, the flow of pressurised gas is indicated by the solid arrows.

The pressurised gas system 30 shown in FIGS. 4 and 5 is part of the marine vessel, but one or more components can also be provided as part of the propulsor.

The pressurised gas system 30 includes a flow meter 38 upstream of the gas outlet 36 which measures the flow rate of pressurised gas to the annular volume from the gas supply unit 34. The flow rate measurements are provided to the gas supply unit 34. A pressure meter 40 measures the gas pressure within the annular volume and provides pressure measurements to the gas supply unit 34. In FIGS. 4 and 5, the various measurements are indicated by dashed arrows.

In use, pressurised gas is delivered into the annular volume 22 to displace any water. The annular volume 22 is preferably substantially filled with pressurised gas and to reduce gas leakage, an annular seal 42 is provided at the open end 24 of the annular volume. As shown in FIGS. 4 and 5, the seal 42 extends between the lower part of the rotary housing 2—e.g., the radially outer surface of each blade module 8*a*, . . . , 8*c* and the upstanding flange 16 of each plate 12*a*, . . . , 12*c*—and the facing surface of the annular collar 20. The seal 42 is formed on the annular collar 20 and is in sliding contact with the propulsor. In FIGS. 4 and 5, the pressurised gas in the annular volume 22 is indicated schematically by the symbol "x".

As shown in FIG. 5, the pressurised gas system 30 can also include a second pressure meter 44 that measures the water pressure outside the annular volume and provides pressure measurements to the controller 34*a* of the gas supply unit 34. The pressurised gas system 30 shown in FIG. 5 has a single second pressure meter 44, but it will be readily understood that two or more second pressure meters can be located on the cyclorotor or the hull of the marine vessel to provide external water pressure measurements from different locations.

The gas supply unit 34 can control the delivery of the pressurised gas to ensure that the water is substantially excluded from the annular volume 22 during operation of the propulsor. The controller 34*a* of the gas supply unit 34 controls the delivery of the pressurised gas based on the measurements provided by the flow meter 38 and the pressure meters 40 and 44. The controller 34*a* can also use other operating parameters such as the speed and draught of the marine vessel, the rotational speed of the propulsor etc. The controller 34*a* can adjust the flow valve(s) 34*b* of the gas supply unit 34*a* to control the delivery of the pressurised gas into the annular volume 22 according to any suitable control—see the description above.

FIG. 5 also shows how any water in the voids 14*a*, . . . , 14*c* that might otherwise be trapped by the upstanding flanges 16 when the pressurised gas is delivered into the annular volume 22 can escape through one or more openings 46 in each flange. Any water that is trapped by the plates 12*a*, . . . , 12*c* is forced radially outwards by the rotation of the rotary housing 2 and flows out through the one or more openings 46, which are located outside of the annular seal 42. This is indicated by the solid arrows in FIG. 5. Each opening 46 can have an associated valve (e.g., a flap or one-way valve) to prevent flow in the reverse direction. A small amount of pressurised gas may be allowed to leak out of the one or more openings 46, or the valves can be designed so that trapped water can be pushed out through the valves by the centrifugal force, but the flow of pressurised gas is prevented. The openings 46 can also be provided inside the annular seal 42.

The invention claimed is:

1. An arrangement comprising a cyclorotor located within an annular structure and a pressurized gas system, the cyclorotor comprising a rotary housing spaced apart from the annular structure by an annular volume, and a plurality of blades (i) being mounted in a respective blade module of a plurality of blade modules extending radially outwardly from a main body of the rotary housing and (ii) extending from a bottom surface of the rotary housing, each blade having a respective blade axis about which it can be pivoted relative to the rotary housing;

wherein, the annular volume comprises one or more recessed areas being defined between adjacent blade modules of the plurality of blade modules;

wherein, the pressurized gas system comprises:

a pressurized gas supply; and one or more gas outlets in fluid communication with each recessed area of the plurality of recessed areas of the annular volume; and wherein, in operation, the pressurized gas system facilitates a delivery of pressurized gas from the pressurized gas supply into the annular volume through the one or more gas outlets, thereby displacing water from the recessed areas.

2. The arrangement according to claim 1, wherein the pressurized gas supply is a compressor.

3. The arrangement according to claim 1, wherein the pressurized gas system further comprises flow meter upstream of the one or more gas outlets, and wherein the controller is adapted to use the flow meter to control the delivery of pressurized gas into the annular volume through the one or more gas outlets.

4. The arrangement according to claim 1, wherein each gas outlet is mounted on the cyclorotor or the annular structure.

5. The arrangement according to claim 1, wherein each gas outlet is an opening in the cyclorotor or the annular structure in fluid communication with the annular volume.

6. The arrangement according to claim 1, wherein the interior of the rotary housing is pressurized by the pressurized gas system and each gas outlet is an opening in the rotary housing in fluid communication with the annular volume.

7. The arrangement according to claim 1, wherein the cyclorotor further comprises a plurality of blade actuators, each blade actuator being associated with a respective one of the blades for pivoting the respective blade about its blade axis.

8. The arrangement according to claim 7, wherein each blade actuator comprises one or more of a mechanical actuator, a hydraulic actuator, and an electric actuator.

9. The arrangement according to claim 1, wherein the annular volume has a first end adjacent the surface of the rotary housing, and a second end.

10. The arrangement according to claim 9, further comprising a first seal on at least one of the rotary housing and the structure at the first end of the annular volume.

11. The arrangement according to claim 9, further comprising a second seal at the second end of the annular volume.

12. The arrangement according to claim 1, wherein the cyclorotor further comprises a slewing bearing rotatably mounting the rotary housing, the slewing bearing comprising a rotating part fixed to the rotary housing and a stationary part.

13. The arrangement according to claim 12, wherein the stationary part is adapted to be fixed to the annular structure, either directly or indirectly by means of a mounting plate or mounting structure.

14. The arrangement according to claim 12, wherein the cyclorotor further comprises an electric machine with a drive shaft that is mechanically connected to the rotating part of the slewing bearing.

15. The arrangement according to claim 1, wherein the pressurized gas system is part of the cyclorotor.

16. The arrangement according to claim 1, wherein the pressurized gas is air.

17. The arrangement according to claim 1, wherein the pressurized gas is an inert gas.

18. A marine vessel comprising the arrangement according to claim 1.

19. A marine vessel comprising an arrangement according to claim 1, wherein the annular structure is part of the hull of the marine vessel, and the pressurized gas system is part of the marine vessel.

20. A method of operating a cyclorotor located within an annular structure, the cyclorotor comprising:

a rotary housing spaced apart from the annular structure by an annular volume; and a plurality of blades (i) being mounted in a respective blade module of a plurality of blade modules extending radially outwardly from a main body of the rotary housing and (ii) extending from a bottom surface the rotary housing, each blade having a respective blade axis about which it can be pivoted relative to the rotary housing;

wherein, the annular volume comprises one or more recessed areas being defined between adjacent blade modules of the plurality of blade modules, the method comprising delivering pressurized gas into the annular volume through one or more gas outlets that are in fluid communication with the annular volume, thereby displacing water from the recessed areas.

21. The method according to claim 20, wherein the delivery of the pressurized gas is controlled based on one or more of the flow rate of the pressurized gas into the annular volume, the gas pressure inside the annular volume, and the water pressure outside the annular volume.

22. The method according to claim 20, wherein the pressurized gas is air.

23. The method according to claim 20, wherein the pressurized gas is an inert gas.

24. The method according to claim 20, further comprising using the delivery of pressurized gas into the annular volume for condition monitoring.

* * * * *